United States Patent

Hanai

[11] Patent Number: 5,816,920
[45] Date of Patent: Oct. 6, 1998

[54] GAME SYSTEM AND METHOD OF ENTERING GAME SYSTEM

[75] Inventor: Naohito Hanai, Yokohama, Japan

[73] Assignee: Namco Ltd., Tokyo, Japan

[21] Appl. No.: 564,152

[22] PCT Filed: Apr. 25, 1995

[86] PCT No.: PCT/JP95/00811

§ 371 Date: Jan. 5, 1996

§ 102(e) Date: Jan. 5, 1996

[30] Foreign Application Priority Data

Apr. 25, 1994 [JP] Japan .................................. 6-108989

[51] Int. Cl.⁶ .................................................. A63F 9/22
[52] U.S. Cl. .................................................. 463/42
[58] Field of Search ................................ 463/42, 40, 7, 463/6; 434/62, 69; 364/410

[56] References Cited

U.S. PATENT DOCUMENTS

| | | | |
|---|---|---|---|
| 4,564,923 | 1/1986 | Nakano | 463/42 |
| 4,572,509 | 2/1986 | Sitrick | 463/42 X |
| 4,958,835 | 9/1990 | Tashiro et al. | |
| 4,998,199 | 3/1991 | Tashiro et al. | |
| 5,275,565 | 1/1994 | Moncrief | 434/69 X |
| 5,292,125 | 3/1994 | Hochstein et al. | 364/410 X |
| 5,299,810 | 4/1994 | Pierce et al. | 434/69 X |
| 5,354,202 | 10/1994 | Moncrief et al. | 434/69 |
| 5,428,528 | 6/1995 | Takenoouchi et al. | 364/410 |

FOREIGN PATENT DOCUMENTS

| | | |
|---|---|---|
| 3-39711 | 6/1991 | Japan . |
| 3-70994 | 11/1991 | Japan . |
| 7-80152 | 3/1995 | Japan . |
| 7-88250 | 4/1995 | Japan . |

*Primary Examiner*—Jessica Harrison
*Assistant Examiner*—Michael O'Neill
*Attorney, Agent, or Firm*—Namco Ltd.

[57] ABSTRACT

This game system enables the entry of a new game terminal into a currently operating multiplayer game system, or the isolation of a specific game terminal from a currently operating multiplayer game system. Each game terminal includes a master/slave setting section which detects whether or not data is being transferred over data transfer lines when that game terminal starts up, and either sets itself to be the master machine if transfer data is not present, or sets itself to be a slave machine if transfer data is already present. The game system also includes an entry acceptance signal transfer section wherein the master machine transfers an entry acceptance signal between game terminals for accepting entries into the game system.

25 Claims, 11 Drawing Sheets

FIG. 7

| ADDRESS | BOARD STATUS | TRANSMIT AND RECEIVE RAM<br>OWN-VEHICLE STATUS |
|---|---|---|
| GAME TERMINAL 10-1 | BOARD STATUS 1 | OWN-VEHICLE STATUS 1 |
| GAME TERMINAL 10-2 | BOARD STATUS 2 | OWN-VEHICLE STATUS 2 |
| GAME TERMINAL 10-3 | BOARD STATUS 3 | OWN-VEHICLE STATUS 3 |
| GAME TERMINAL 10-4 | BOARD STATUS 4 | OWN-VEHICLE STATUS 4 |
| GAME TERMINAL 10-5 | BOARD STATUS 5 | OWN-VEHICLE STATUS 5 |
| GAME TERMINAL 10-6 | BOARD STATUS 6 | OWN-VEHICLE STATUS 6 |
| GAME TERMINAL 10-7 | BOARD STATUS 7 | OWN-VEHICLE STATUS 7 |
| GAME TERMINAL 10-8 | BOARD STATUS 8 | OWN-VEHICLE STATUS 8 |

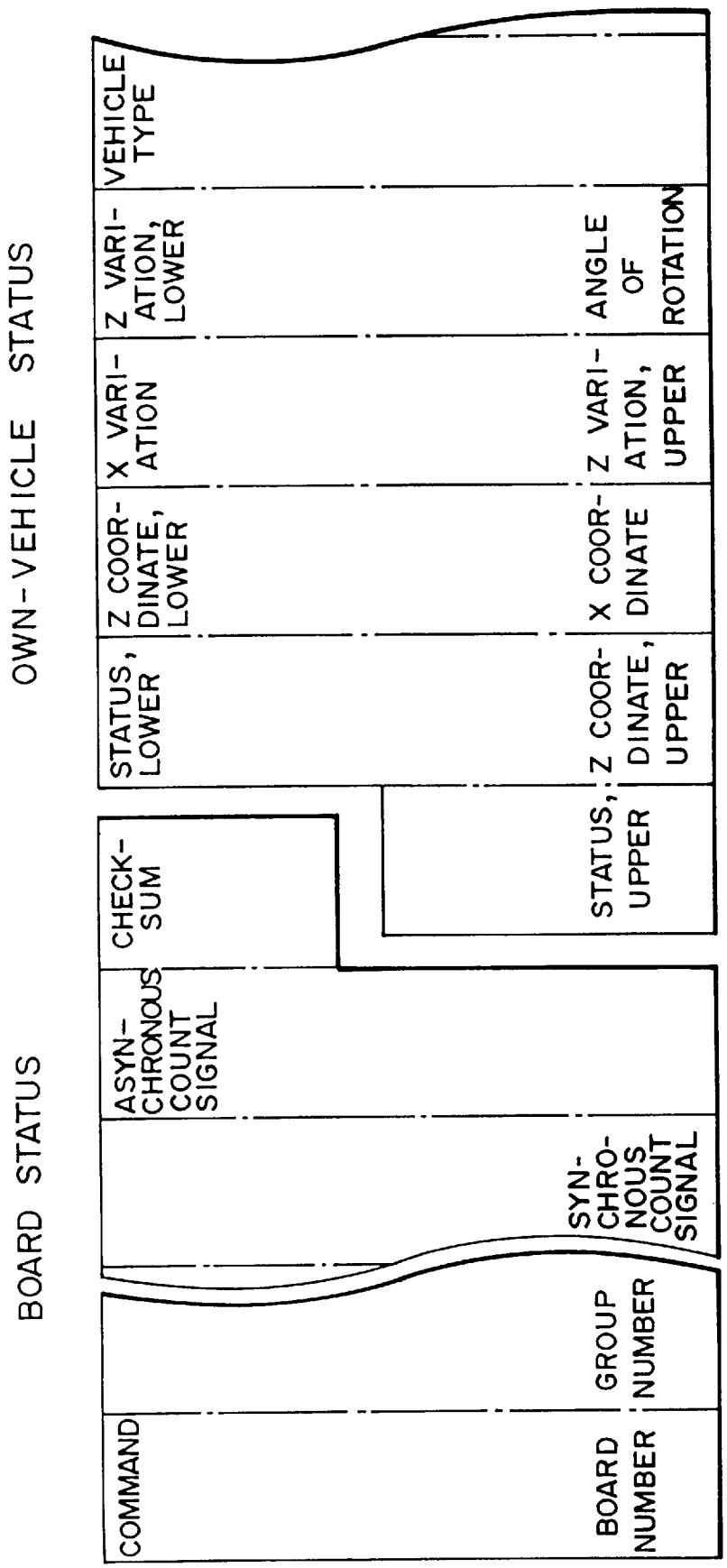

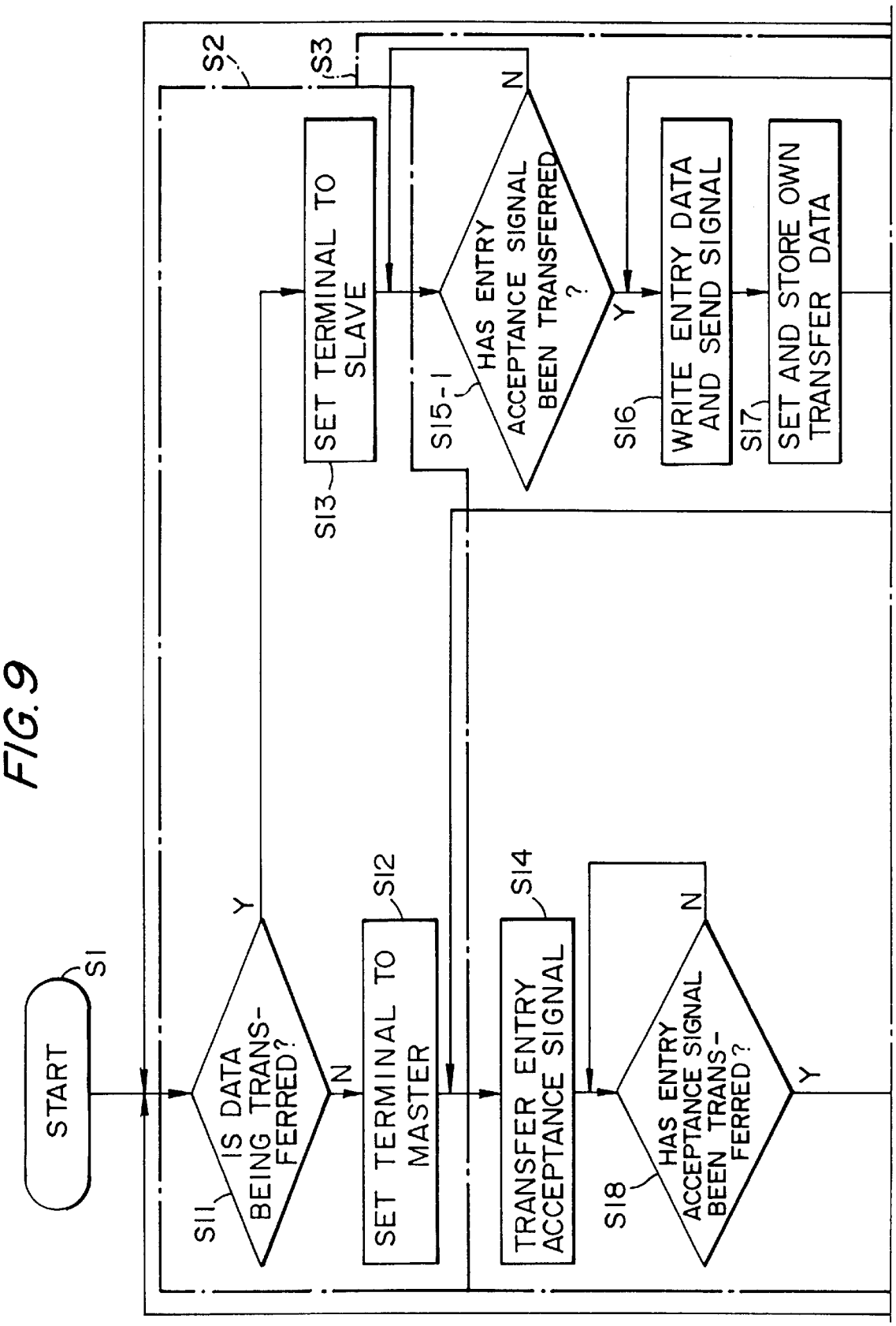

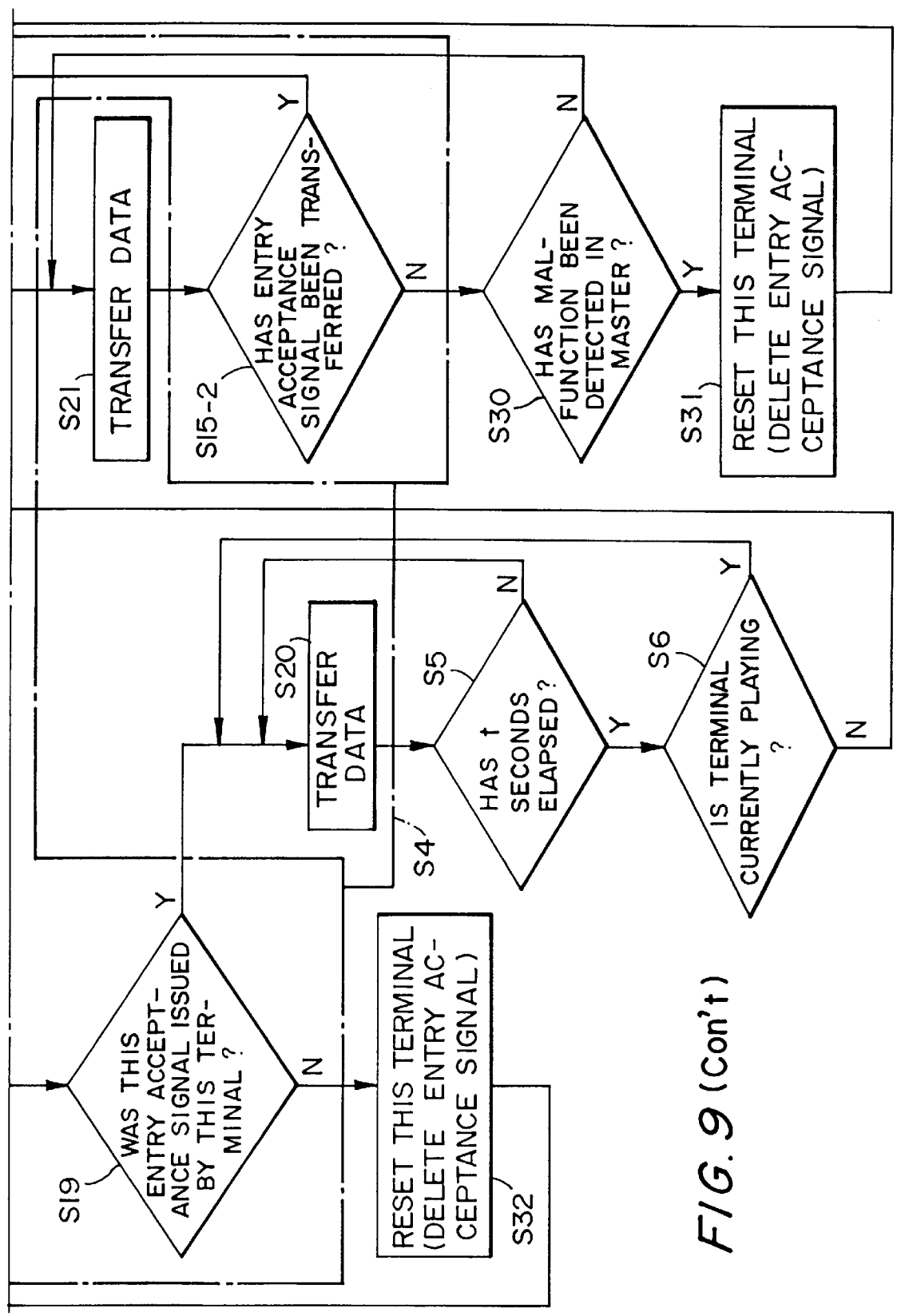
FIG. 9 (Con't)

GAME SYSTEM AND METHOD OF ENTERING GAME SYSTEM

TECHNICAL FIELD

This invention relates to a game system in which a plurality of independent game terminals that can mutually transfer data are connected by data transfer lines into a configuration in which they can provide multiplayer games, and also to a method of enabling a game terminal to enter such a game system.

BACKGROUND OF ART

Game systems have been developed and commercialized in the past in which a plurality of independent game terminals are used to provide a multiplayer game. With such a game system, each of the individual game terminals can provide a single-player game, or a plurality of these game terminals can provide a multiplayer game.

One example of such a game system consists of a plurality of independent driving-simulator game terminals connected together by data transfer lines. A player selecting the single-player game can enjoy a simulation in which a racing car driven by the player competes with a racing car operated by a computer, in a game space displayed on a screen. Similarly, a player selecting a multiplayer game against other players at other driving-simulator game terminals can enjoy a simulation in which a racing car operated by the player competes with racing cars operated by the other players within the same game space.

However, with the prior-art game system, the plurality of game terminals that configure this system have to be specified when the system is turned on. This causes a problem in that it is not possible to allow a new game terminal to enter the system without turning off the system, nor is it possible to isolate a specific game terminal from the game system.

Assume, for example, that eight game terminals are connected together by data transfer lines, With such a setup, the operator of the game system might wish to turn on only six of the eight game terminals to operate a multiplayer game system consisting of those six game terminals when there are few customers or when the operator wants to perform maintenance on two game terminals of the eight game terminals.

When the number of customers increases, or the maintenance has been completed, the operator would want the remaining two game terminals to enter the game system and thus increase the number of terminals operating.

With a prior-art game system, since the entry of a game terminal can only be accepted when the system is turned on, the above operation is performed by turning all six of the currently operating game terminals off, adding the two off-line game terminals, then turning the power on to all eight game terminals together to perform the re-entry procedure. However, this re-entry procedure has problems in that it is not desirable from the commercial point of view, and moreover it is laborious. With a multiplayer game system in particular, it is common to find that any of a number of game terminals always have customers playing on them, and it is most likely that a number of game terminals are always in use at busy times. In such a case, the temporary halting of all the game terminals that are operating to allow this re-entry procedure would cause an extremely large problem from the commercial point of view. Moreover, this reentry procedure is a problem in that it puts a large load on the operating staff when the floor is crowded.

This problem occurs not only when a new game terminal enters the prior-art game system while it is operating, but also when some of the game terminals have to be isolated from the currently operating game system. It could happen that a malfunction occurs for some reason in one game terminal while a game system configured of eight game terminals is operating. In such a case, the operation of the entire system has to be temporarily halted to allow the malfunctioning terminal to be removed from the system.

DISCLOSURE OF THE INVENTION

The present invention has been developed in the light of the above-described concerns with the deficiencies of the prior art and has as its objective the provision of a multi-player game system that enables the operation of allowing a new game terminal to enter the game system while it is operating, as well as the operation of isolating a specific game terminal from the operating game system. It also provides a method of entering such a game system.

In order to achieve the above objective, a first aspect of this invention provides:

a game system comprising a game terminal acting as a master machine and at least one game terminal acting as a slave machine, connected by data transfer lines capable of mutually transmitting and receiving data, wherein each of these game terminals is configured to be capable of executing either a single-player game or a multiplayer game with other game terminals, wherein:

the game terminal acting as the master machine is configured to repeatedly send toward the slave machine, which is connected thereto by the data transfer lines, an entry acceptance signal for accepting an entry of the slave machine into the game system;

the game terminal acting as the slave machine is configured to start sending data after receiving the entry acceptance signal and entering the game system;

the game terminal acting as the master machine is configured to halt the sending of the entry acceptance signal when at least some of the game terminals are providing the multiplayer game; and an operation of accepting the entry of a game terminal is repeated without obstructing the multiplayer game.

In the game system of this aspect of this invention, a plurality of independent game terminals are connected together by data transfer lines. Each of these game terminals can operate independently to provide a single-player game, or provide a multiplayer game with a plurality of players at other game terminals.

In accordance with this aspect of the invention, an entry acceptance operation is repeated from a game terminal acting as the master machine (hereinafter called the "master machine") to a game terminal acting as a slave (hereinafter called a "slave machine") which is connected thereto by a data transfer line. This entry acceptance operation is as described below.

First, an entry acceptance signal that accepts an entry into the system is sent from the master machine to the slave machines. After each of the slave machines receives this entry acceptance signal, it sets its own game terminal into a state in which data can be transferred to and from other game terminals, and enters the system.

Thus the game system of this embodiment enables the entry of a new game terminal into the system or the isolation of any desired game terminal from the system, without halting the currently operating system.

A game system in accordance with a second aspect of this invention is preferably configured in such a manner that:

the entry acceptance signal comprises a plurality of entry write areas for writing entry data for each of the game terminals acting as the slave machine;

the game terminal acting as the master machine comprises an overall data transfer control means for sending a data transfer signal comprising a plurality of data write areas to each of the game terminals and providing overall control over the transfer of data by the entire game system;

the game terminals acting as the slave machine is configured to write entry data for the slave machine into an empty entry write area in the entry acceptance signal received thereby, send the thus modified entry acceptance signal on toward other game terminals, and also set a write address for data concerning the slave machine in a data write area of the data transfer signal to correspond to a write address for the entry data; and each time the entry of a game terminal is performed, an address for writing data into the data transfer signal is set.

This configuration ensures that each game terminal's own data write address for the data transfer signal is set automatically on the basis of the entry write address for the entry acceptance signal. Thus, each of the game terminals is automatically set into a state in which it can transfer data to and from the other game terminals, as soon as it enters the system. This means that the game terminal's own data and the data of other game terminals can be identified and processed without any error, no matter how many terminals have entered the system.

In accordance with this aspect of the invention, since the game terminal that has become the master machine has overall control over the transfer of data throughout the entire game system, data can be transferred smoothly between the game terminals that have entered the system.

A third aspect of this invention provides:

a game system wherein a plurality of independent game terminals are connected by data transfer lines capable of mutually transmitting and receiving data, and which provides a multiplayer game whereby a player at each of the game terminals plays within a common game space against players at other game terminals while watching a game image on a screen, wherein:

each of the game terminals comprises:

master/slave setting means for detecting whether or not there is data present on the data transfer lines when that game terminal is started up, and either setting this game terminal to be a master machine when transfer data is not present, or setting this game terminal to be a slave machine when transfer data is already present;

entry acceptance signal transfer means for repeatedly sending an entry acceptance signal for accepting an entry of the slave machine into the game system, when this game terminal has been set to be the master machine; and data transfer means for sending data after receiving the entry acceptance signal and entering the game system, when the game terminal has been set to be the slave machine; and wherein:

an operation of accepting the entry of a game terminal is repeated.

In the game system of this aspect of this invention, a plurality of independent game terminals are connected together by data transfer lines. Each of these game terminals can operate independently to provide a single-player game, or provide a multiplayer game with a plurality of players at other game terminals.

In accordance with this aspect of the invention, an entry acceptance operation is repeated from a game terminal acting as the master machine (hereinafter called the "master machine") to a game terminal acting as a slave (hereinafter called a "slave machine"), which is connected thereto by a data transfer line. This entry acceptance operation is as described below.

First, an entry acceptance signal that accepts an entry into the system is sent from the master machine to the slave machines. After each of the slave machines receives this entry acceptance signal, it sets its own game terminal into a state in which it can transfer data to and from other game terminals, and enters the system.

Thus the game system of this embodiment enables the entry of a new game terminal into the system or the isolation of any desired game terminal from the system, without halting the currently operating system.

A particular feature of this aspect of the invention concerns the manner in which each of the game terminals is configured to automatically determine whether it is to become a master machine or a slave machine when the system starts up, and transfer the entry acceptance signal.

Assume for example that a game system is configured of seven game terminals. When each of the game terminals configuring the system is turned on and the system starts up, each of the game terminals performs the operation described below to set itself as either a master machine or a slave machine.

When each of the game terminals starts up, the master/slave setting means thereof first detects whether or not there is data being transferred over the data transfer lines. If this game terminal is the first machine to start up, there will be no data on the transfer lines. In that case, the game terminal sets itself to be a master machine. If there is already data on the transfer lines, the game terminal determines that another game terminal is already acting as a master machine, so it sets itself to be a slave machine. In this manner, the first game terminal to be turned on when the system starts up automatically sets itself to be a master machine, and each game terminal that is turned on later automatically sets itself to be a slave machine.

Once the master and slave(s) have been set, each of the game terminals uses the entry acceptance signal transfer means thereof to repeat the above described entry operation.

Since this aspect of the invention thus makes it unnecessary to have a configuration in which each of the game terminals is dedicated to be either the master machine or a slave machine, the configuration of the game system can be simplified.

In particular, if the configuration is such that the master machine and slave machines are dedicated, the master machine must always be used when the system starts up. This means that the master machine is used far more often than the slave machines, and thus it is highly likely that the master machine will break down. If the master machine should break down, the system will no longer be able to operate while the master machine is out of service. In contrast, since this aspect of the invention makes it possible for any game terminal to be used as either a master machine or a slave machine, it avoids the above problem.

In accordance with a fourth aspect of this invention, an entry acceptance signal transfer means of each of the game terminals is preferably configured in such a manner that:

sending of the entry acceptance signal is halted when at least some of the game terminals are providing the multiplayer game; and the operation of accepting the entry of a game terminal is repeated without obstructing the multiplayer game.

By configuring the system in this manner so that the sending of this entry acceptance signal is halted when at least some of the game terminals are providing the multiplayer game, the operation of accepting the entry of a game terminal can be performed without obstructing the multiplayer game.

In accordance with a fifth aspect of this invention, the master/slave setting means of each of the game terminals is preferably configured in such a manner that:

when an entry acceptance signal is received from another game terminal and this game terminal has been set to be the master machine, the master/slave setting means releases the setting of this game terminal as the master machine, re-detects whether or not there is data present on the data transfer lines, and then either sets this game terminal to be the master machine when transfer data is not present, or sets this game terminal to be the slave machine when transfer data is already present.

A game system in accordance with a sixth aspect of this invention is preferably configured in such a manner that each of the game terminals comprises:

reset means for severing a master/slave relationship between the game terminals; and malfunction detection means for detecting a malfunction in the master machine and causing the reset means to operate; whereby:

the master/slave relationship between game terminals is re-established after the reset means operates.

In other words, if a malfunction should occur in the game system, the master/slave relationship between the game terminals is temporarily severed, then this master/slave relationship—between the game terminals can be reestablished. This ensures that, if it is assumed that some sort of malfunction occurs in the game terminal acting as the master machine while the system is operating, the master/slave relationship can be reestablished between the remaining game terminals without halting the system, and thus the game system can continue operating.

The game system in accordance with a seventh aspect of this invention is preferably configured in such a manner that all of the game terminals are connected in a loop structure by data transfer lines and data transfer occurs in one direction around the loop; and each of the game terminals comprises:

reset means for forcibly halting data transfer over the data transfer lines and severing the master/slave relationship between the game terminals; and malfunction detection means for detecting a malfunction in the master machine and causing the reset means to operate; whereby:

the master/slave relationship between game terminals is re-established after the reset means operates.

Use of this configuration, in which the game terminals are connected together by data transfer lines in a loop structure and data is transferred in one direction around the loop, enables simple data transfer between game terminals. This data transfer can be forcibly cut by using the reset means to turn off part of the loop, enabling a simple method of cancelling the master/slave relationship.

A game system in accordance with a eighth aspect of this invention is preferably configured in such a manner that the entry acceptance signal comprises a plurality of entry write areas for writing entry data for each of the game terminals acting as the slave machine;

each of the game terminals comprises:

an overall data transfer control means for sending a data transfer signal comprising a plurality of data write areas to the slave machines and providing overall control over the transfer of data by the entire game system, when this game terminal has been set to be the master machine;

entry means for writing entry data for this game terminal into an empty entry write area of the entry acceptance signal received thereby and sending the thus modified entry acceptance signal on toward other game terminals, when this game terminal has been set to be a slave machine;

address setting means for setting a write address for data concerning this game terminal in a data write area of the data transfer signal, on the basis of a write address of the entry data in the entry acceptance signal; and data transfer means for receiving the data transfer signal, reading data for other game terminals therefrom, writing data concerning this game terminal into the data transfer signal on the basis of the thus set write address, and sending the data transfer signal to the other game terminals; whereby:

the transfer of data between game terminals that have entered the game system is controlled.

The above configuration ensures that the write address in the data transfer signal for the current game terminal is automatically set on the basis of the entry data write address in the entry acceptance signal. Thus, each of the game terminals is automatically set into a state in which it can transfer data to and from the other game terminals, as soon as it enters the system. This means that the game terminal's own data and the data of other game terminals can be identified and processed without any error, no matter how many terminals have entered the system.

In accordance with this aspect of the invention, since the game terminal that has become the master machine has overall control over the transfer of data throughout the entire game system, data can be transferred smoothly between the game terminals that have entered the system.

A particular feature of this aspect of the invention concerns the manner in which, if a malfunction occurs in the game terminal that has become the master machine, the master/slave relationship can be reestablished so that overall control over the data transfer of the entire system is provided by using one of the unaffected game terminals as the master machine, to allow the game to continue.

A game system in accordance with a ninth aspect of this invention is preferably configured in such a manner that all of the game terminals are connected in a loop structure by data transfer lines, and data transfer occurs in one direction around the loop.

This configuration makes it possible to perform the above described master/slave setting operation, the entry acceptance operation, and the transfer of data between the game terminals, both simply and reliably.

An entry method in accordance with a tenth aspect of this invention concerns a game system wherein a plurality of independent game terminals are connected by data transfer lines capable of mutually transmitting and receiving data, and which provides a multiplayer game whereby a player at each of the game terminals plays within a common game space against players at other game terminals while watching a game image on a screen; wherein the entry method comprises the steps of:

setting a master/slave relationship on the basis of whether or not data is passing through the data transfer lines when each of the game terminals starts up, in such a manner that this game terminal is set to be a master machine when data is not present or a slave machine when data is already present;

repeatedly sending an entry acceptance signal from the master machine to the slave machine, for accepting an entry of this slave machine into the game system; and starting data transfer after the slave machine has received the entry acceptance signal; whereby:

the entry into the game system of a new game terminal can be accepted even after the game system has started up.

In accordance with the method of this aspect of the invention, each game terminal is set to be either a master machine or a slave machine when the game system starts up. Each of the game terminals then repeats the entry acceptance operation.

This configuration makes it possible to provide a method of entering a game system which facilitates the entry of a new game terminal into the game system and also makes it possible to easily isolate a game terminal from the currently operating game system.

BRIEF DESCRIPTION OF THE DRAWINGS

FIG. 7 is a diagram illustrative of data that is transferred between game terminals.

FIG. 8 is a diagram illustrative of a detailed example of data that is transferred between game terminals.

FIG. 9 is a flowchart of a specific example of the operation of the game system of this embodiment.

BEST MODE FOR CARRYING OUT THE INVENTION

Preferred embodiments of this invention will now be described with reference to the accompanying figures.

Overall System

Figure 1:
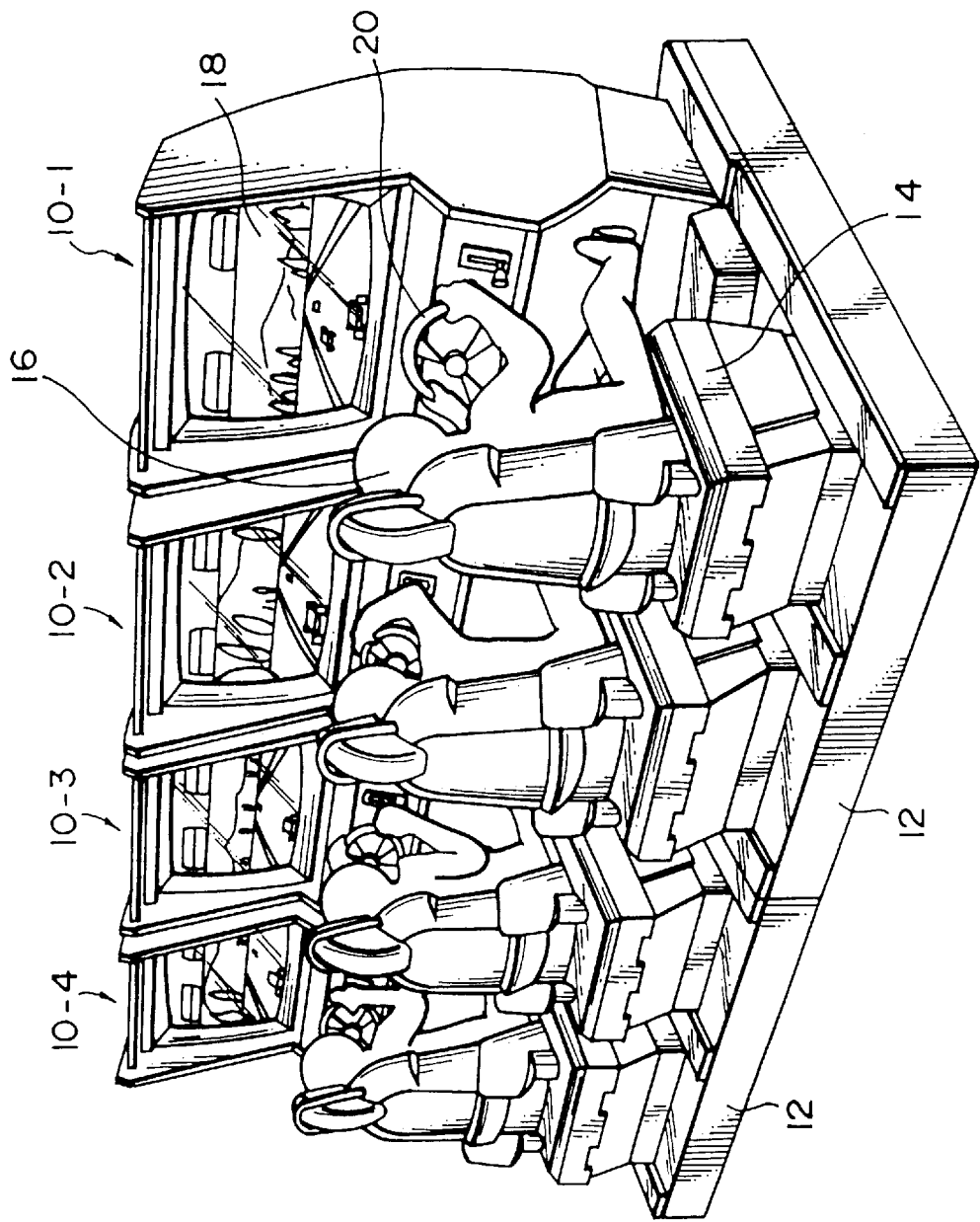
FIG. 1 is an external perspective view of a driving-simulator game system to which this invention is applied.

An example of a circuit-racing type of game system to which this invention is applied is shown in FIG. 1. In the game system of this embodiment, a plurality of independent game terminals 10-1, 10-2, . . . are mutually connected together by data transfer lines.

In this case, "independent game terminals" means that each of the game terminals 10-1, 10-2, . . . is configured in such a manner that it can be used to provide a single-player game independently of other game terminals. It does not mean that the housings of the game terminals are formed independently. In this embodiment, two game terminals 10-1 and 10-2 are provided on the same base 12, and another two game terminals 10-3 and 10-4 are also provided on the same base 12, this base 12 being different from the base 12 of the first two game terminals.

Each of these game terminals 10 is modeled on the driving seat of a racing car. The configuration is such that a player 16 sitting in a seat 14 operates a steering wheel 20 as well as other controls such as accelerator and brake pedals, while watching a game scene displayed on a screen 18 to the front, to drive the player's car that is displayed on the screen 18 and thus compete with other racing cars appearing in the game space.

Figure 2:
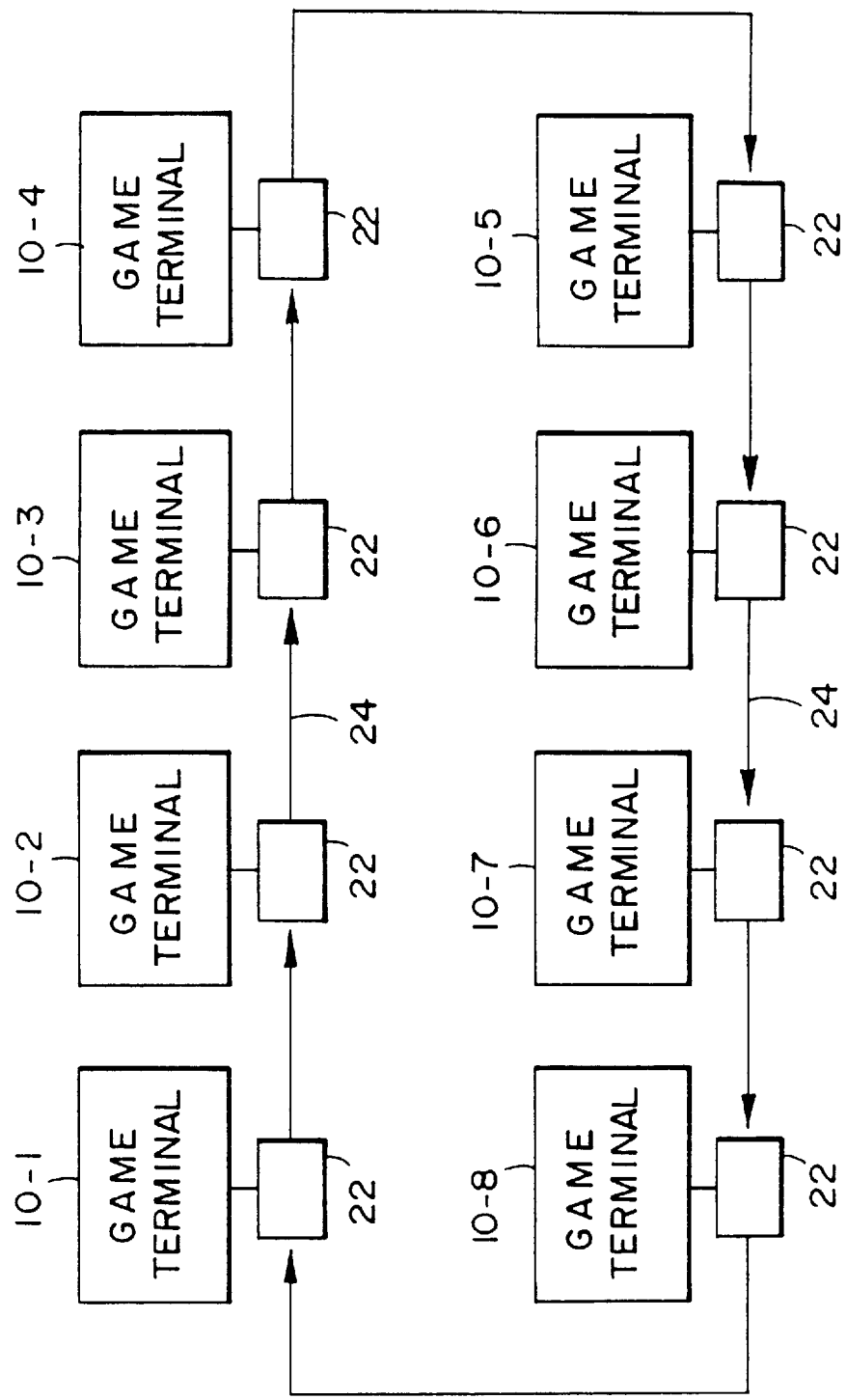
FIG. 2 is a diagram illustrative of one example of the connection states of the system of FIG. 1.

These game terminals 10-1, 10-2, . . . are connected together in a loop via communications interfaces 22 and transfer lines 24, as shown in FIG. 2. Each of the game terminals 10-1, 10-2, . . . of this embodiment is configured in such a manner as to transfer game information to and from the other game terminals through the corresponding communications interfaces 22 and transfer lines 24. In this embodiment, the loop of transfer lines 24 transfers data in the clockwise direction.

Entry of Game Terminal

Figure 3:
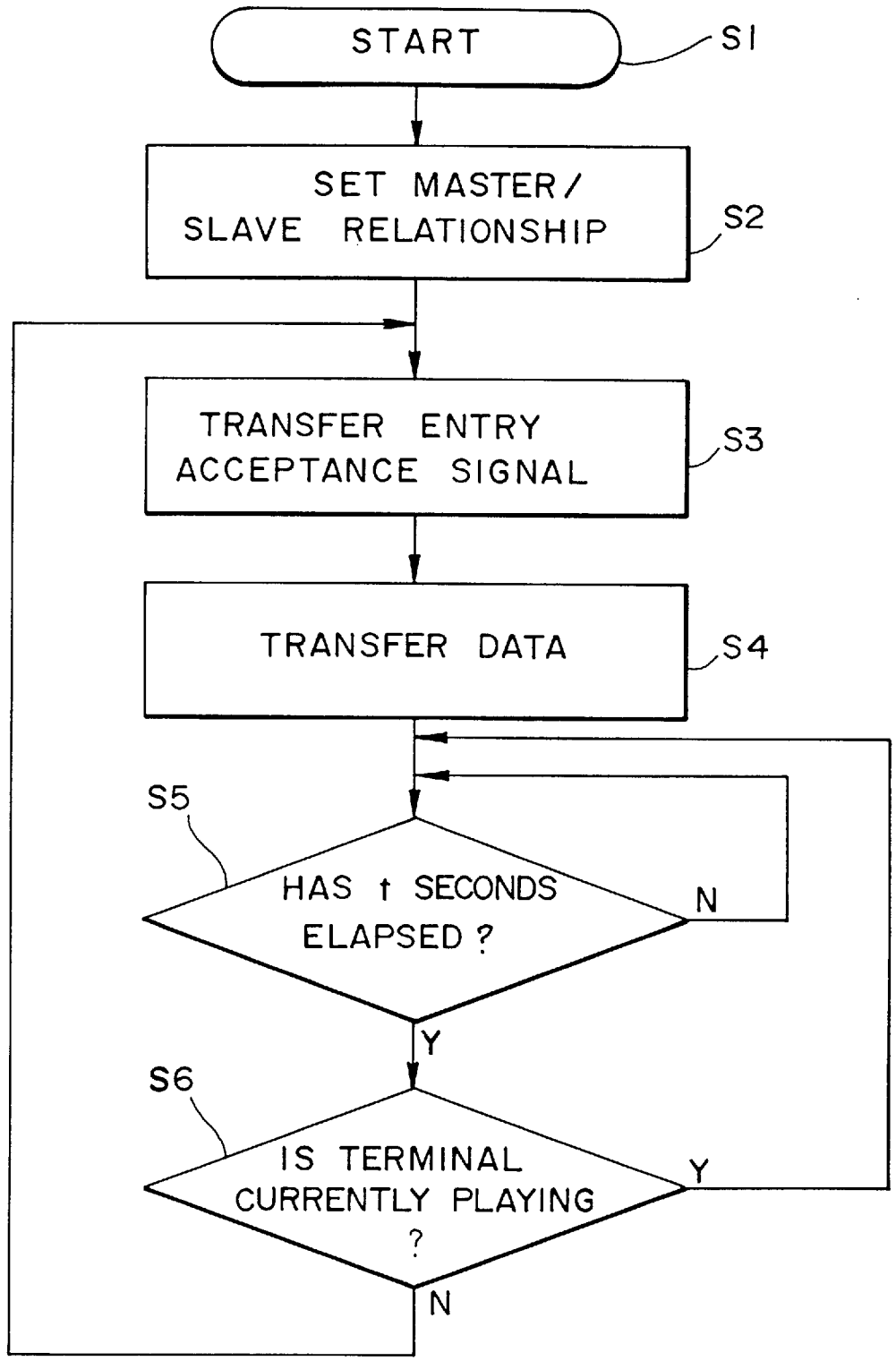
FIG. 3 is a flowchart of the operation of the game system of this embodiment.

An example of the operation of entering this game system of game terminals is shown in FIG. 3.

For this example, assume that six game terminals 10-1 to 10-6 in the game system shown in FIG. 2 are turned on to start up the system. In this case, when the six game terminals 10-1 to 10-6 are turned on and the system starts up (step S1 each of the game terminals 10-1 to 10-6 independently starts transmitting data over the transfer lines 24. At this point, the start-up times of each of the game terminals 10-1 to 10-6 differ very slightly. To be more specific, the power to each of the game terminals 10-1 to 10-6 is turned on at different timings.

When the power to each of the game terminals 10-1 to 10-6 is turned on, that game terminal first determines whether or not data is already being transferred over the transfer lines 24, then it performs an operation that sets itself to being either a master machine or a slave machine, on the basis of that determination (step S2).

In other words, if a game terminal 10 detects absolutely no data when it starts up, it determines that it is the first machine to enter the system, and sets itself to be the master machine. If there is data on the transfer lines 24 when a game terminal 10 starts up, it determines that there is another game terminal in the system that has already set itself to be the master machine, so it sets itself to be a slave machine. In this case, assume that the game terminal 10-1 is the first to be turned on and has thus become the master machine, and the remaining game terminals 10-2 to 10-6 are set to be slave machines.

Once the master/slave relationship has been set in this manner, the game terminal 10-1 that has become the master then sends an entry acceptance signal over the transfer lines 24 to the other game terminals 10-2 to 10-6 that have become slaves, to accept the entry of those game terminals (step S3).

Figure 4:
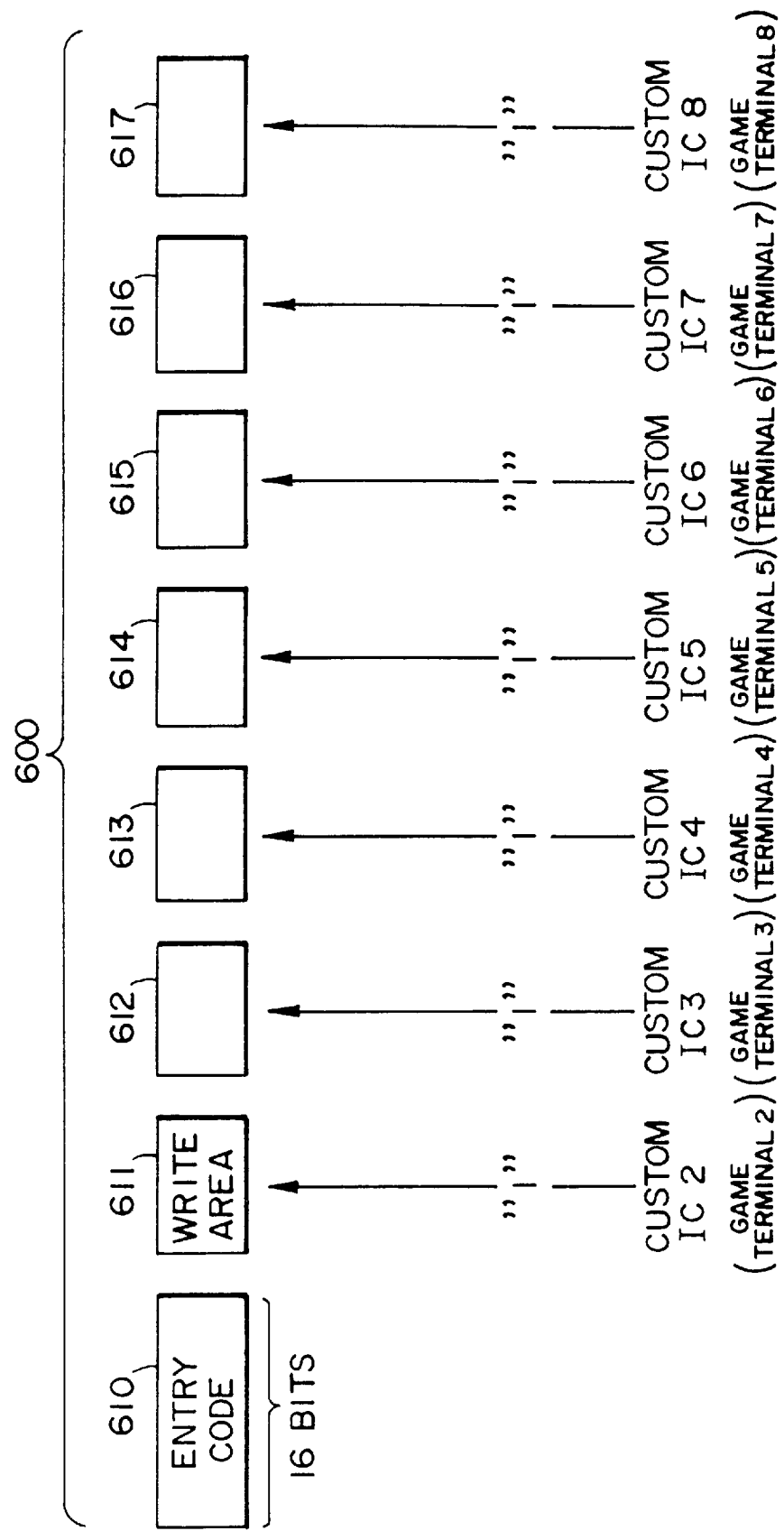
FIG. 4 is a diagram illustrative of an entry acceptance signal that is transferred during an entry acceptance operation.

An example of the entry acceptance signal that is sent out at that point is shown in FIG. 4. An entry acceptance signal 600 of this embodiment is configured to comprise a 16 bit entry code 610 followed by entry write areas 611 to 617 for seven terminals.

When this entry acceptance signal 600 is sent from the master game terminal 10-1, it is transferred to each of game terminals 10-2 to 10-6 in sequence, then it returns to the game terminal 10-1.

During this time, when each of the slave game terminals 10-2 to 10-6 receives the entry acceptance signal 600, it checks the entry code 610 to verify that that received signal is the entry acceptance signal. It then checks the entry write areas 611 to 617 in sequence to determine whether or not there is an empty area. It writes its own entry data in the empty area nearest the start of the signal. Assume that, in this case, the entry acceptance signal 600 is transferred to the game terminals 10-2 to 10-6 when they have all been turned on. The game terminal 10-2, which received the entry acceptance signal 600 first, writes its own entry data in the first write area 611 (sets a flag) then transfers the modified signal to the next game terminal 10-3. The game terminal 10-3 writes its own entry data in the next empty area 612, then transfers the entry acceptance signal 610 that it has modified to the next game terminal 10-4. In this manner, the transfer of the entry acceptance signal 600 is repeated at each of the game terminals. This sequentially writes entry data for each of the game terminals 10-2 to 10-6 that has been turned on into the entry write areas 611 to 615.

When the entry acceptance signal 600 is sent from the game terminal 10-6, it passes through the game terminals 10-7 and 10-8 that have not been turned on, then completes the loop and returns to the master game terminal 10-1.

It should be obvious that no entry data can be written into the remaining empty areas 616 and 617 for the game terminals 10-7 and 10-8 that have not been turned on.

A characteristic feature of this embodiment is the manner in which the execution of this entry operation causes each of the game terminals 10 to be automatically set into a state in which data can be transferred to and from the other game terminals.

In other words, the configuration is such that, when each of the game terminals 10 writes its own entry data into an empty entry write area in the entry acceptance signal 600, a data write address for a data transfer signal 700 (which will be described later) is automatically set on the basis of the address of the write to that entry write area.

This embodiment is configured in such a manner that, if one of the slave game terminals 10-2 to 10-6 writes entry data to the nth write area of the entry acceptance signal, that terminal's data write address for the data transfer signal 700 is automatically set to (n+1).

Therefore, if the next terminal 10-4, for example, writes its own entry data to the third entry write area 613 (where n=3) of the entry acceptance signal 600, that game terminal 10-4 increments the write address n by 1 to give a value of 4, and sets that value as its write address for the data transfer signal 700. Note that further details of this process will be given later in these specifications.

When the master game terminal 10-1 receives the entry acceptance signal 600 to which the entry data has been written in this manner, it then sends the data transfer signal 700 to the slave game terminal 10-2 to 10-6 (step S4).

This data transfer signal 700 is configured to comprise a the data code 710 followed by data write areas 711 to 718 for eight terminals. After the master game terminal 10-1 has written its own data in the first data write area 711, as shown in FIG. 8, it sends the modified data transfer signal 700 to the game terminal 10-2.

Each of the game terminals 10 is configured to verify that that data is the data transfer signal, on the basis of the data code 710, and read and write data as will be described below.

In other words, when it receives the data transfer signal 700, the game terminal 10-2 has already set the write address for its own entry data to n=1. This means that it writes its own data in the write area 712 that is in the (n+1)th, or second, position from the start of the data transfer signal 700. It is also configured to read the data for the other machines that is written to the other write areas 711 and 713 to 718, and provide either a single-player game or a multi-player game.

Once the game terminal 10-2 has finished writing and reading the data in this manner, the modified data transfer signal 700 is sent to the next game terminal 10-3 where data is written and read in a similar manner.

When the data transfer signal 700 that has been transferred in this manner completes the loop shown in FIG. 2 and returns to the first game terminal, it is in a state such that data on six game machines that have entered the system has been written thereto.

Therefore, the data written in each of the storage areas 711 to 718 can be updated with the latest data by re-sending this data transfer signal 700 to each of the game terminals.

This means that each of the game terminals 10-1 to 10-6 configuring the system can transfer game information to and from the other game terminals, thus enabling a multiplayer game.

After a time of t seconds has elapsed after the game system of this embodiment ends this entry operation of step S3, one of the game terminals 10 configuring the current system determines whether or not it is currently playing (steps S5 and S6). If it is determined that it is not playing, the above described entry acceptance operation of step S3 is performed again, and the game terminal is reset to enter the game system.

In this embodiment, the above entry acceptance operation (step S3) is repeated every t=5 seconds. This ensures that if, for example, either of the remaining game terminals 10-7 and 10-8 is switched on after the system has started up, not only the entry data for game terminals 10-1 to 10-6 but also that of the newly switched-on terminal 10-7 or 10-8 can be written into storage areas of the entry acceptance signal, by the transfer of the entry acceptance signal in a step S3 that is performed soon thereafter. Moreover, during the entry operation of step S3, since each of the game terminals 10 automatically sets the write address for its own data within the data transmission signal 700, the transfer operation can start as soon as the entry operation of step S3 has ended, that is, at step S4.

This ensures that the entry of a newly switched-on game terminal 10-7 or 10-8 can be accepted even when the system is operating, enabling the playing of a multiplayer game from the maximum of eight game terminals for this system.

If it then becomes necessary for some reason to isolate one game terminal 10-7 from the game system in which eight game terminals 10-1 to 10-8 have entered, for example, the power to that game terminal 10-7 can simply be turned off, and the entry acceptance operation of the subsequent execution of step S3 will ensure that the game system is configured of only seven game terminals 10-1 to 10-6 and 10-8. This means that any desired game terminal can be isolated from a game system that is operating.

Note that the game system of this embodiment is configured in such a manner that entry acceptance operation of step S3 is not executed while a game terminal is currently playing (step S6), as shown in FIG. 3. This is because, if an attempt is made to transfer the entry acceptance signal while the terminal is playing, it could cause a communications malfunction.

Note that step S2 in the flowchart of FIG. 3 corresponds to the master/slave setting step and step S3 corresponds to the entry acceptance step.

Game Terminal Configuration

Figure 5:
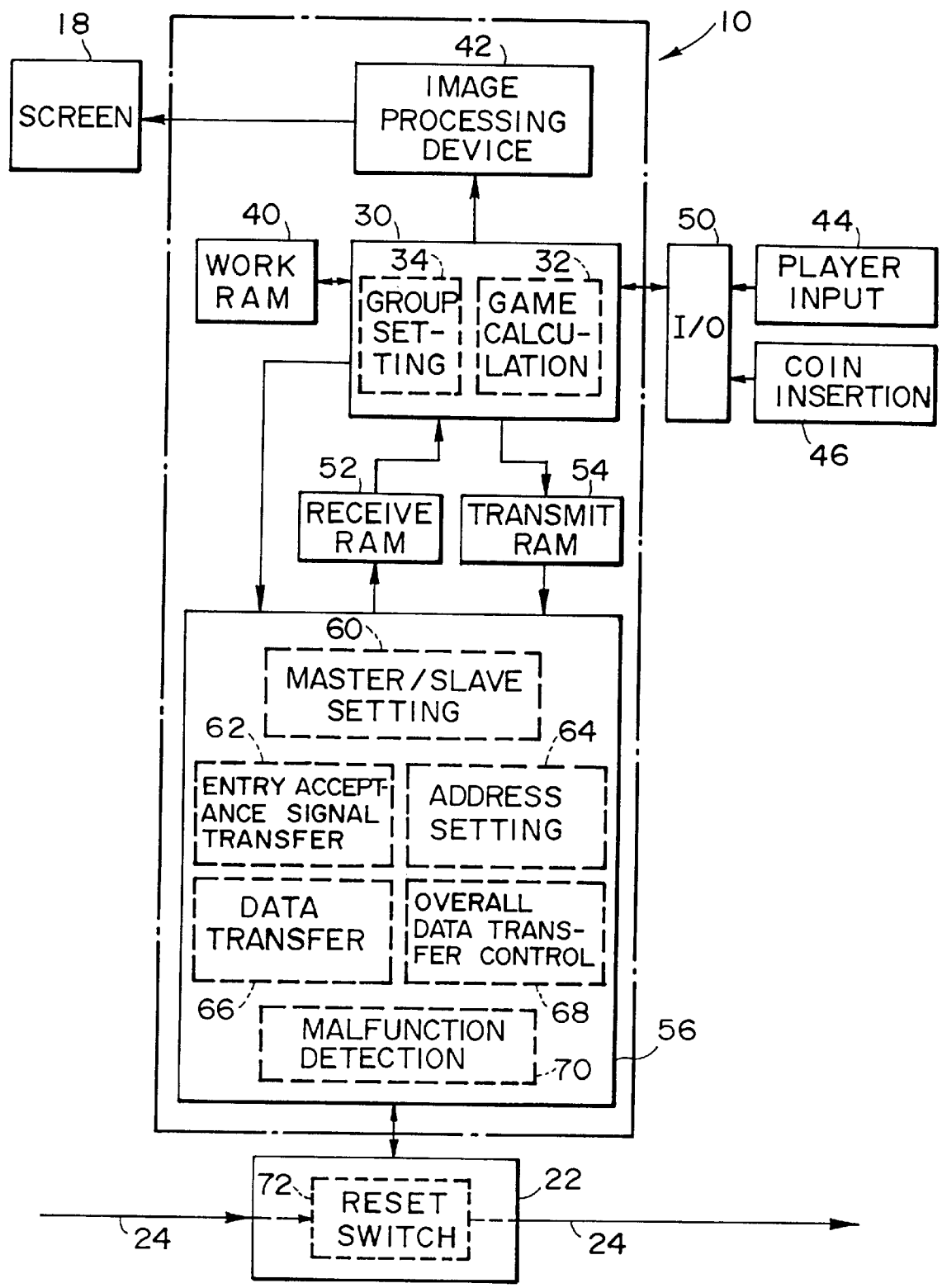
FIG. 5 is a block diagram of a game terminal that forms part of the system of this embodiment.

Details of the configuration of the game terminal 10 of this embodiment are shown in FIG. 5.

The game terminal 10 of this embodiment comprises a calculation control section 30, work RAM 40, an image processing device 42, transmit RAM 54, receive RAM 52, a custom IC 56 for transfer control, the screen 18, a player input section 44, a coin insertion section 46, and an I/O interface 50.

The custom IC 56 is configured to function as a master/slave setting section 60, an entry acceptance signal transfer section 62, an address setting section 64, a data transfer section 66, an overall data transfer control section 68, and a malfunction detection section 70.

The master/slave setting section 60 performs the above described step S2 of FIG. 3, and the entry acceptance signal transfer section 62 and the address setting section 64 perform steps S2 to S6.

In other words, when each game terminal starts up, its master/slave setting section 60 detects whether or not there is data flowing over the data transfer lines 24 and performs the master/slave setting operation as appropriate. If transfer data is not present, it sets that game terminal to be the master; if there is transfer data, it sets that game terminal to be a slave.

If that game terminal has been set to be the master, the entry acceptance signal transfer section 62 thereof sends the entry acceptance signal 600 shown in FIG. 4 over the data transfer lines 24 towards the connected slave machines, to accept the entry of other terminals into the game system (step S3).

If that game terminal has been set to be a slave, the entry acceptance signal transfer section 62 thereof receives this entry acceptance signal 600, then performs an entry operation that writes the entry data for that terminal into an empty storage area of the entry acceptance signal 600.

The entry operation in this case consists of detecting an empty storage area in the entry acceptance signal 600 of FIG. 4, then writing entry data into that empty area. If the nth write area of the seven entry write areas 611 to 617 is detected to be empty, the data is written to that nth empty area. In this case, the address setting section 64 of that game terminal 10 sets the write address for that terminal's data in the data transfer signal 700 shown in FIG. 10, on the basis of the write address n of the entry data for that terminal in the entry acceptance signal 600. In this embodiment, the (n+1)th address is set in the data transfer signal 700.

This address setting is performed at each of the slave game terminals 10 whenever the entry acceptance signal 600 is received and entry data is written into that entry acceptance signal 600.

In this manner, entry data for each slave machine entering the system is written to the entry acceptance signal and also the write address for the data transfer signal 700 is set while the entry acceptance signal sent from the master machine passes around the transfer lines 24 that are connected in a loop and returns to the master machine.

Figure 10:
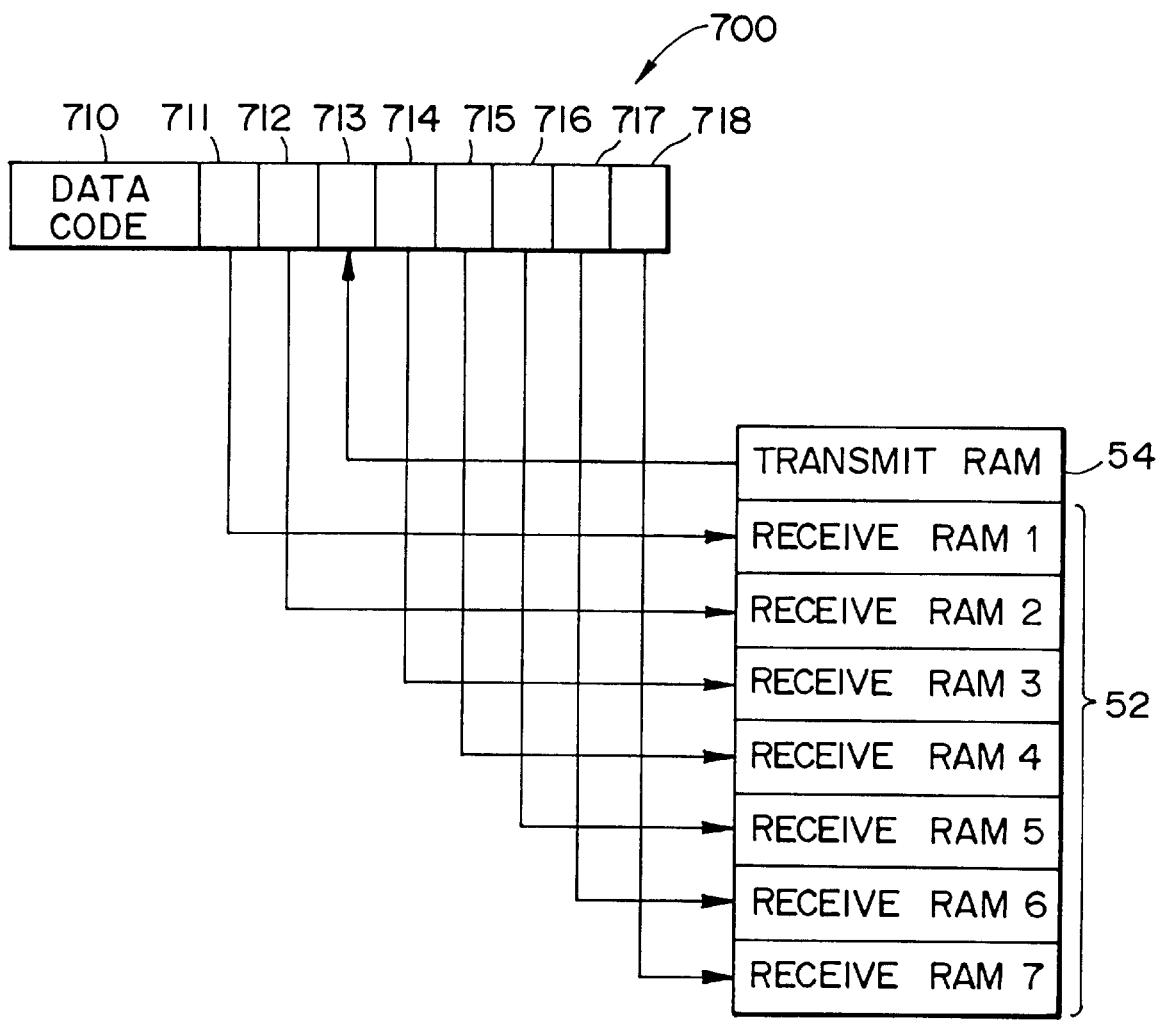
FIG. 10 is a diagram illustrative of a data transfer signal.

If a certain game terminal has been set to be the master machine, the overall data transfer control section 68 thereof is configured to send the data transmission signal 700 shown in FIG. 10 to the slave machines and provide overall control over the transfer of data over the entire system. During this time, the data transfer section 66 of the master game terminal 10 is configured to write the data for that terminal to the first write area 711 of the data transmission signal 700.

When the data transfer section 66 of each of the slave game terminals 10 receives this modified data transmission signal 700, it reads the data on the other machines that is written in write areas 711 to 718 (excluding the data in the area corresponding to its own write address (n+1)) and transfers the data to the corresponding receive RAM 52. This means that (N–1) write areas are set in the receive RAM 52, where N is the maximum number of game terminals 10 originally configuring the game system (N is 8 in this case). The data transfer section 66 is also configured to read the data for the other seven game terminals that is included in the entry acceptance signal 600 from the write areas 611 to 617, and transfer it to the receive RAM 52.

This data transfer section 66 is configured to read data for its own game terminal from the transmit RAM 54 and write that data to a write area of the data transfer signal 700, on the basis of the write address (n+1) set by the address setting section 64.

Assume for example that the slave game terminal 10-2 has received the data transfer signal 700. The data from the other seven game terminals is read from the storage areas 711, 712, and 714 to 718 in the data transmission signal 700 and is transferred to the receive RAM 52 of the slave game terminal 10-2. In synchronism therewith, the data on that game terminal 10 which is written in the corresponding transmit RAM 54 is written to the write area 713 corresponding to the write address (n+)=3 that was set by the address setting section 64. The thus modified transfer signal 700 is then sent on to the other game terminals.

The above described transfer of the data transfer signal 700 is repeated around the loop shown in FIG. 2. Each time one of the game terminals 10 receives the data transfer signal 700, it can always obtain the latest data from the data transfer signal because it operates in such as manner as to always update the data in the storage area corresponding to its own write address, and send the resultant signal on to the next machine..

Thus, in the game system of this embodiment, the transfer of data between the game terminals that have entered the system is implemented by writing and reading data with respect to the data transmission signal 700 that is sent from the master game terminal. This means that the overall data transfer control section 68 of the master game terminal 10 provides overall control over the transfer of data between game terminals.

Note that the use of this overall control method could cause a problem if a malfunction occurs in the master game terminal 10. Data transfer would be disabled, making it impossible for the multiplayer game to continue even although the other game terminals 10 have absolutely no problem.

In order to avoid such a problem, the communications interface 22 is provided with a reset means consisting of a reset switch 72 that forcibly cuts the data transfer over the transfer lines 24 and severs the master/slave relationship between the game terminals.

The malfunction detection section 70 detects a malfunction in the master game terminal 10 on the basis of the acceptance state of data and the entry acceptance signal, causes the reset switch 72 to operate if a malfunction is detected, and thus severs the master/slave relationship between the game terminals. It releases the reset switch 72 after a predetermined time has elapsed, sets a state in which data transfer over the transfer lines 24 is enabled, and once again causes the master/slave setting operation (step S2) to be performed between the game terminals, as shown in FIG. 3.

This enables the setting of the master/slave relationship between the remaining game terminals that are still operating, before the entry acceptance operation of step S3 is performed. Thus the game system of this embodiment can set the master/slave relationship between the remaining game terminals if a malfunction should occur in the master game terminal, enabling normal operation.

The player input section 44 is configured to comprise various operating controls, such as the steering wheel 20 and accelerator and brake pedals, by which the player 16 can drive the racing car.

The calculation control section 30 is configured to comprise a game calculation section 32 and a group setting section 34.

The game calculation section 32 performs game calculations to allow the racing car driven by the player to compete with other racing cars on a course laid out in a predetermined game space, based on operational signals from the player input section 44, data within the work RAM 40 and a predetermined game program, then outputs the calculation results to the image processing device 42.

The image processing device 42 calculates image data for the game image on the basis of these game calculation results, and displays it on the screen 18.

Figure 6A:
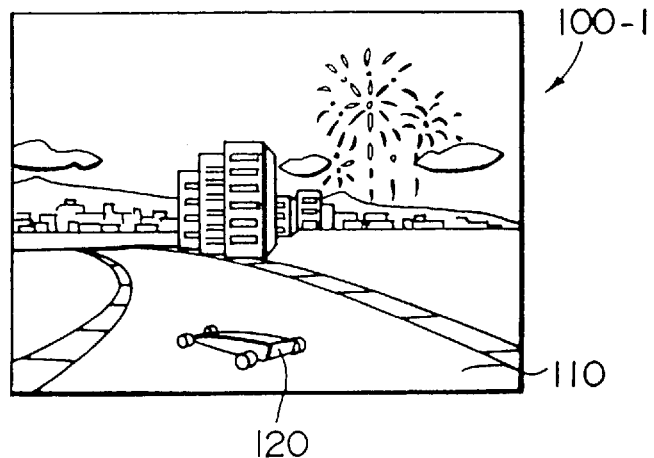
FIG. 6A and FIG. 6B show examples of game images displayed on the screen of the game terminal.

This causes a game image 100-1 such as that shown in FIG. 6A to appear on the screen 18. This game image 100-1 shows a state in which a racing car 120 driven by the player runs on a course 110.

In this embodiment, if the games terminal 10 is providing a single-player game, the player can enjoy playing a game competing against a computer-operated car that appears in the game space. If a multiplayer game has been set up among a plurality of game terminals 10, each player can enjoy playing a game competing against racing cars operated by the other players.

Multiplayer Game

The description now turns briefly to the use of the above described game system in a multiplayer game.

The configuration of data transferred between game terminals in this embodiment is shown in FIG. 7. The transfer data of each of the game terminals 10 basically comprises board status data and own-vehicle status data.

Specific details of this transfer data are given in FIG. 8. The board status data is configured to comprise a board number that is used as identification data for each of the game terminals 10, data for setting factors such as game conditions, a group number that specifies a group providing a multiplayer game, and other necessary data. The own-vehicle status data is configured to comprise the coordinate position (Z, X) of that vehicle in the game space, plus other running data. This own-vehicle status data is sequentially calculated by the game calculation section 32 every ⅟₆₀ second.

The thus calculated board status and own-vehicle status data is sent to the transmit RAM 54 every ⅟₆₀ second.

When the data transfer signal 700 shown in FIG. 10 is received through the communications interface 22, the custom IC 56 reads its own terminal's data from the transmit RAM 54, writes that data to the predetermined write area of the data transfer signal 700, and sends its own data on to the other game terminals through the communications interface 22 and the transfer line 24, as previously described.

If the system is configured so that six game terminals 10-1 to 10-6 out of the eight game terminals 10-1 to 10-8 shown in FIG. 2 are turned on, for example, the information on these game terminals shown in FIG. 7 is transferred through the transfer lines 24 in the clockwise direction in FIG. 2.

The custom IC 56 of each game terminal 10 sequentially stores in the receive RAM 52 the data on the other five game terminals that is received through the transfer line 24 and the communications interface 22.

In this case, the group setting section 34 determines which of the game terminals are to be set in the group for the multiplayer game, based on input signals from the player input section 44 and the coin insertion section 46 and data from the other game terminals that was received in the receive RAM 52. More specifically, it calculates and sets the group number of the board status data (see FIG. 8) that is output to the transmit RAM 54. Several different methods could be used for setting this group, as required. A specific example of such a method is disclosed in Japanese Patent Publication No. 3-70993 filed by the applicant, line 33 of column 7 to line 44 of column 11, and another example thereof is disclosed in lines 19 to 42 of column 12.

The setting of the group could be performed by the group setting section 34 as described below.

Assume that three players have approached the three game terminals 10-71, 10-2, and 10-4 to play a multiplayer game, when the game system is configured of six game terminals 10-1 to 10-6.

In this case, each of the group setting sections 34 of the game terminals 10-1, 10-2, and 10-4 sets the same group number, writes that number as part of the transfer data in the corresponding transmit RAM 54, and sends that data on to the other terminals.

When a group is set for a multiplayer game in this fashion, the group setting section 34 of the game terminal 10-1, for example, selectively transfers the data received from the other game terminals 10-2 and 10-4 of that group into the corresponding work RAM 40, while referring to the group numbers in the data on the other five game terminals that is written to the transmit RAM 54. Each game calculation section 32 performs game calculations on the basis of that terminals own data and the received data of the game terminals in the same group written in the work RAM 40, outputs the calculated game data to the image processing device 42, and displays the game image on the screen 18.

Figure 6B:
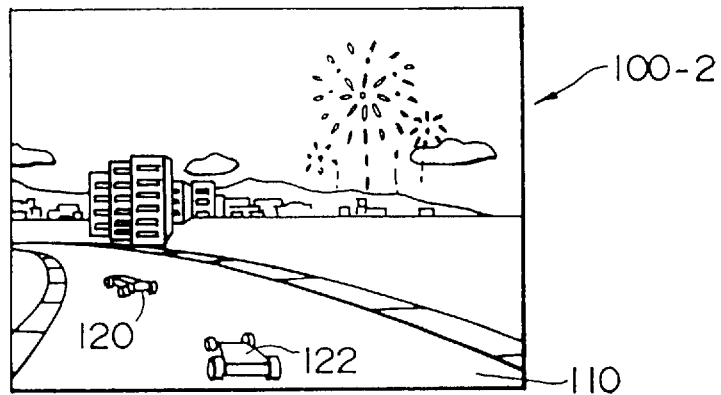

In this case, if the player at the game terminal 10-1 starts the terminal running first, the racing car 120 driven by that player appears on the screen 18 as shown in FIG. 6A. When the racing car of the game terminal 10-2 starts running after that of the game terminal 10-1, both that player's racing car 122 and the above described racing car 120 of the game terminal 10-1 appear on the screen 18 of the game terminal 10-1, as shown in FIG. 6B.

This enables each player at the game terminals 10-1, 10-2, and 10-4 that have been set in the group to enjoy a multiplayer game while comparing their driving techniques as they watch their racing cars on the screen 18.

If, for example, another multiplayer group is set between two of the remaining game terminals 10-3 and 10-6 during this game, each of the two groups can participate in their separate multiplayer games.

Details of Entry Operation

A specific example of the entry operation performed in the game system configured as shown in FIG. 2 of the game terminals shown in FIG. 5 is shown in FIG. 9. Note that steps in this flowchart that correspond to steps in FIG. 3 are given the same reference numbers and their description is omitted from this section.

In this case, assume that six game terminals 10-1 to 10-6 are turned on when the system starts up, while two game terminals 10-7 and 10-8 are turned off.

When power is turned on and the system starts up (step S1), the master/slave relationship is set between the game terminals 10-1 to 10-6 that have entered the system (step S2).

This master/slave setting step S2 is configured to comprise three steps S11, S12, and S13.

In this case, since the game terminal 10-1 was turned on first, the master/slave setting section 60 thereof sets that terminal as the master machine and sends out the entry acceptance signal (steps S11 and S12). Since data is already flowing through the transfer lines 24 when each of the remaining game terminals 10-2 to 10-6 is turned on, those terminals set themselves to be slave machines (steps S11 and S13).

In this manner, the master/slave relationship between the game terminals is first set, then the entry acceptance operation of step S3 is performed.

This entry acceptance step S3 comprises steps S14, S15-1, S15-2, and S16 to S19.

First of all, the entry acceptance signal 600 shown in FIG. 4 is sent from the game terminal 10-1 that has been set to be the master to the slave game terminals 10-2 to 10-6 (step S14). When each of the slave machines 10-2 to 10-6 receives this entry acceptance signal, it writes entry data into one of the write areas 611 to 617, starting from the area with the lowest number. After completing this write operation, it sends the modified entry acceptance signal 600 on to the next game terminal (steps S15-1 and S16).

At the same time, if the write address for this entry data in the entry acceptance signal 600 is n, that game terminal 10 sets (n+1) as the write address for its own data with respect to the data transfer signal 700 (step S17).

After entry data for each of the game terminals 10-2 to 10-6 has been written into the entry acceptance signal 600 of FIG. 4 in this manner, the entry acceptance signal 600 is received by the game terminal 10-1 (step S18).

On receiving the entry acceptance signal 600, the master game terminal 10-1 then transfers the data of step S4 between the slave game terminals 10-2 to 10-6.

This data transfer step S4 is configured to comprise a step S20 which transfers master machine data and a step S21 which transfers slave machine data.

The master game terminal 10-1 first sends the data transfer signal 700, into the data write area 711 of which is written data for that terminal from its own overall data transfer control section 68, to the slave game terminals 10-2 to 10-6, and establishes overall control over the data transfer of the entire system (step S20).

As each of the slave game terminals 10-2 to 10-6 receives this transfer signal 700, it reads the data on the other machines that is written into that signal 700, then transfers it to its own receive RAM 52. It also writes its own data from the transmit RAM 54 into the transfer signal 700 and sends the modified signal 700 on to the other terminals (step S21).

Thus data is transferred between the game terminals 10-1 to 10-6.

This transfer of data between the game terminals determines whether a number of the game terminals provides a multiplayer game or a single game terminal provides a single-player game.

In the system of this embodiment, the master game terminal determines whether or not five seconds have elapsed after the entry acceptance signal of step S14 is transferred (step S5), then it determines from the command state of the received data whether or not the currently playing game terminals are included in the system (step S6). If five seconds have elapsed after the entry operation of step S14 and it has been determined that there is no currently playing game terminal, and only if these conditions are satisfied, the transfer of the entry acceptance signal from the master game terminal 10-1 to the slave game terminals 10-2 to 10-6 is repeated (step S14). During this time, each of the game terminals 10-1 to 10-6 performs the operations of the above described steps S3 and S4.

Thus, if the game terminals 10-7 and 10-8 are turned on after the system has started up, for example, the entry acceptance operation of the subsequent step S3 results in the acceptance of the entry of this game terminals 10-7 and 10-8 into the system. Thereafter, data is transferred between up to eight game terminals 10-1 to 10-8 and a multiplayer game can be provided thereby.

If the power to game terminal 10-3 is subsequently turned off, the entry acceptance operation of step S3 will automatically isolate the game terminal 10-3 from the system to form a game system capable of providing a multiplayer game with seven game terminals 10-1, 10-2, and 10-4 to 10-8.

In this manner, the game system of this embodiment enables the entry of a new terminal into the currently operating system or the isolation of a currently entered game terminal from the system, without halting the operation of the entire system.

The malfunction detection section 70 of each of the slave game terminals 10-2 to 10-6 checks regularly to determine whether or not data is being sent from the master game terminal 10-1, and thus determine whether or not the master game terminal 10-1 is operating normally (step S30).

If a malfunction should occur in the master game terminal 10-1, data transfer over the entire system will be disrupted and it will no longer be possible to provide a multiplayer game. Therefore, if one of the slave game terminals, such as game terminal 10-3, detects a malfunction in the master machine, the reset switch 72 thereof is forcibly activated (step S31) and the master/slave relationship in the system is severed. The reset switch 72 is then released to set the state in which data can be transferred over the transfer lines 24.

This ensures that the master/slave setting operation of step S2 can be performed between the normal game terminals 10-2 to 10-6, so that the entire system can operate normally.

During this process, the original master machine 10-1 that has malfunctioned receives the entry acceptance signal from the other game terminal that has become the master machine (step S18), determines therefrom that this is not the entry acceptance signal that was issued by itself (step S19), and thus releases its own master setting (step S32).

Since all of the game terminals 10-1 to 10-8 that form the system of this embodiment have exactly the same configuration, the configuration of the entire system can be simplified.

Note that the above description of this embodiment concerned an example in which the master/slave relationship was set between the game terminals after the system had started up, but it should be obvious to those skilled in the art that the master and slave game terminals could be set before then, if necessary.

This embodiment was also described as consisting of a plurality of game terminals connected together in a loop, but this invention is not limited thereto and can equally well be applied to any other type of network configuration that is connected together by transfer lines.

Similarly, although the embodiment of this invention was described as being applied to a driving simulator game, this invention is not limited thereto and can equally well be applied to various other types of game.

I claim:

1. A game system, comprising:

a plurality of game terminals including a master machine and at least one other game terminal connected by data transfer lines for mutually transmitting and receiving data, each of said game terminals executing one of a single-player game and a multiplayer game with other game terminals, wherein:

an entry acceptance signal is repeatedly sent from the master machine to the at least one other game terminal even after the game system is operating for accepting an entry of said at least one other game terminal as at least one slave machine into said game system without obstructing said multiplayer game;

said at least one slave machine sends data after receiving said entry acceptance signal and entering said game system, and said master machine halts sending of said entry acceptance signal when at least one of said game terminals are providing said multiplayer game.

2. A game system comprising:

a plurality of game terminals connected by data transfer lines for mutually transmitting and receiving data, wherein said game system provides a multiplayer game wherein a player at one of said game terminals plays within a common game space against players at other of said game terminals while watching a game image on a screen;

each of said game terminals including:

master/slave setting means for detecting whether or not there is data present on said data transfer lines when that game terminal is started up, and one of setting said game terminal to be a master machine when transfer data is not present, and setting said game terminal to be a slave machine when transfer data is already present;

entry acceptance signal transfer means for repeatedly sending an entry acceptance signal even after said game system is operating for accepting an entry of at least one of said slave machine and another game terminal into said game system when said game terminal has been set to be said master machine; and data transfer means for sending data after receiving said entry acceptance signal and entering said game system, when said game terminal has been set to be said slave machine.

3. The game system as defined in claim 2 wherein:

said entry acceptance signal transfer means of each of said game terminals is configured in such a manner that:

said entry acceptance signal is halted when at least one of said game terminals are providing said multiplayer game; and the operation of accepting the entry of a game terminal is repeated without obstructing said multiplayer.

4. The game as defined in claim 2 wherein:

said master/slave setting means of each of said game terminals is configured in such a manner that:

when an entry acceptance signal is received from another game terminal and said game terminal has been set to be the master machine, said master/slave setting means releases the setting of said terminal as said master machine, re-detects whether there is data present on said data transfer lines, and then sets said game terminal to be said master machine when transfer data is not present, and sets said game terminal to be said slave machine when transfer data is already present.

5. The game system as defined in claim 3 wherein:

said master/slave setting means of each of said game terminals is configured in such a manner that:

when an entry acceptance signal is received from another game terminal and said game terminals has been set to be the master machine, said master/slave setting means releases the setting of said game terminal as said master machine, redetects whether there is data present on said data transfer lines, and then sets said game terminal to be said master machine when transfer data is not present, and sets said game terminal to be said slave machine when transfer data is already present.

6. The game system as defined in claim 2 wherein each of said same terminals further comprises:

reset means for severing a master/slave relationship between said game terminals; and malfunction detection means for detecting a malfunction in said master machine and causing said reset means to operate, wherein another master/slave relationship between said game terminals is established.

7. The game system as defined in claim 3 wherein each of said game terminals further comprises:

reset means for severing a master/slave relationship between said game terminals; and malfunction detection means for detecting a malfunction in said master machine and causing said reset means to operate, wherein another master/slave relationship between said game terminals is established.

8. The game system as defined in claim 4 wherein each of said game terminals farther comprises:

reset means for severing a master/slave relationship between said game terminals; and malfunction detection means for detecting a malfunction in said master machine and causing said reset means to operate, wherein another master/slave relationship between said game terminals is established.

9. The game system as defined in claim 5 wherein each of said game terminals further comprises:

reset means for severing a master/slave relationship between said game terminals; and malfunction detection means for detecting a malfunction in said master machine and causing said reset means to operate, wherein another master/slave relationship between said game terminals is established.

10. The game system as defined in claim 2 wherein:

said game terminals are connected in a loop structure by said data transfer lines and data transfer occurs in one direction around said loop; and each of said game terminals further comprises:

reset means for forcibly halting data transfer over said data transfer lines and severing a master/slave relationship between said game terminals; and malfunction detection means for detecting a malfunction in said master machine and causing said reset means to operate, wherein another master/slave relationship between game terminals is established.

11. The game system as defined in claim 3 wherein:
said game terminals are connected in a loop structure by said data transfer lines and data transfer occurs in one direction around said loop; and
each of said game terminals further comprises:
reset means for forcibly halting data transfer over said data transfer lines and severing a master/slave relationship between said game terminals; and
malfunction detection means for detecting a malfunction in said master machine and causing said reset means to operate, wherein
another master/slave relationship between game terminals is established.

12. The game system as defined in claim 4 wherein:
said game terminals are connected in a loop structure by said data transfer lines and data transfer occurs in one direction around said loop; and
each of said game terminals further comprises:
reset means for forcibly halting data transfer over said data transfer lines and severing a master/slave relationship between said name terminals; and
malfunction detection means for detecting a malfunction in said master machine and causing said reset means to operate, wherein
another master/slave relationship between game terminals is established.

13. The game system as defined in claim 5 wherein:
said game terminals are connected in a loop structure by said data transfer lines and data transfer occurs in one direction around said loop; and
each of said game terminals further comprises:
reset means for forcibly halting data transfer over said data transfer lines and severing a master/slave relationship between said game terminals; and
malfunction detection means for detecting a malfunction in said master machine and causing said reset means to operate, wherein
another master/slave relationship between game terminals is established.

14. The game system as defined in claim 1 further comprising:
a plurality of entry write areas in said entry acceptance signal for writing entry data for each of said slave machine;
an overall data transfer control means in said master machine for sending a data transfer signal comprising a plurality of data write areas to each of said game terminals and for providing overall control of data transfer in the game system, wherein
said slave machine writes entry data for said slave machine into an empty entry write area in said entry acceptance signal to modify the entry acceptance signal, sending the modified entry acceptance signal to other game terminals, and setting a write address for data concerning said slave machine in a data write area of said data transfer signal to correspond to a write address for said entry data whenever said another game terminal enters the system.

15. The game system as defined in claim 2 wherein:
said entry acceptance signal comprises a plurality of entry write areas for writing entry data for each of said slave machine, each of the entry write areas having a write address of said entry data;
each of said game terminals including:
an overall data transfer control means for sending a data transfer signal comprising a plurality of data write areas to slave machines and providing overall control over data transfer in the game system when said game terminal has been set to be the master machine;
entry means for writing entry data for said game terminal into an empty entry write area of said entry acceptance signal to modify the entry acceptance signal and sending the modified entry acceptance signal to other game terminals, when said game terminal has been set to be a slave machine;
address setting means for setting a write address for data concerning said game terminal in a data write area of said data transfer signal based on said write address of said entry data in said entry acceptance signal; and
data transfer means for receiving said data transfer signal, reading data for other game terminals, writing data concerning said game terminal into said data transfer signal based on the set write address, and sending said data transfer signal to the other game terminals.

16. The game system as defined in claim 3 wherein:
said entry acceptance signal comprises a plurality of entry write areas for writing entry data for each of said slave machine, each of the entry write areas having a write address of said entry data;
each of said game terminals including:
an overall data transfer control means for sending a data transfer signal comprising a plurality of data write areas to slave machines and providing overall control over data transfer in the game system when said game terminal has been set to be the master machine;
entry means for writing entry data for said game terminal into an empty entry write area of said entry acceptance signal to modify the entry acceptance signal and sending the modified entry acceptance signal to other game terminals, when said game terminal has been set to be a slave machine;
address setting means for setting a write address for data concerning said game terminal in a data write area of said data transfer signal based on said write address of said entry data in said entry acceptance signal; and
data transfer means for receiving said data transfer signal, reading data for other game terminals, writing data concerning said game terminal into said data transfer signal based on the set write address, and sending said data transfer signal to the other game terminals.

17. The game system as defined in claim 4 wherein:
said entry acceptance signal comprises a plurality of entry write areas for writing entry data for each of said slave machine, each of the entry write areas having a write address of said entry data;
each of said game terminals includes:
an overall data transfer control means for sending a data transfer signal comprising a plurality of data write areas to slave machines and providing overall control over data transfer in the game system when said same terminal has been set to be the master machine;
entry means for writing entry data for said game terminal into an empty entry write area of said entry acceptance signal to modify the entry acceptance signal and sending the modified entry acceptance signal to other game terminals, when said game terminal has been set to be a slave machine; address setting means for setting a write address for data concerning said game terminal in a data write area of said data transfer signal based on said write address of said entry data in said entry acceptance signal; and data transfer means for receiving said data transfer signal, reading data for other game terminals, writing data concerning said game terminal into said data transfer signal based on the set write address, and sending said data transfer signal to the other game terminals.

18. The game system as defined in claim 5 wherein:

said entry acceptance signal comprises a plurality of entry write areas for writing entry data for each of said slave machine, each of the entry write areas having a write address of said entry data;

each of said game terminals includes:

an overall data transfer control means for sending a data transfer signal comprising a plurality of data write areas to slave machines and providing overall control over data transfer in the game system when said game terminal has been set to be the master machine;

entry means for writing entry data for said game terminal into an empty entry write area of said entry acceptance signal to modify the entry acceptance signal and sending the modified entry acceptance signal to other game terminals, when said game terminal has been set to be a slave machine;

address setting means for setting a write address for data concerning said game terminal in a data write area of said data transfer signal based on said write address of said entry data in said entry acceptance signal; and data transfer means for receiving said data transfer signal, reading data for other game terminals, writing data concerning said game terminal into said data transfer signal based on the set write address, and sending said data transfer signal to the other game terminals.

19. The game system as defined in claim 10 wherein:

said entry acceptance signal comprises a plurality of entry write areas for writing entry data for each of said slave machine, each of the entry write areas having a write address of said entry data;

each of said game terminals includes:

an overall data transfer control means for sending a data transfer signal comprising a plurality of data write areas to slave machines and providing overall control over data transfer in the game system when said game terminal has been set to be the master machine;

entry means for writing entry data for said game terminal into an empty entry write area of said entry acceptance signal to modify the entry acceptance signal and sending the modified entry acceptance signal to other game terminals, when said game terminal has been set to be a slave machine;

address setting means for setting a write address for data concerning said game terminal in a data write area of said data transfer signal based on said write address of said entry data in said entry acceptance signal; and data transfer means for receiving said data transfer signal, reading data for other game terminals, writing data concerning said game terminal into said data transfer signal based on the set write address, and sending said data transfer signal to the other game terminals.

20. The game system as defined in claim 11 wherein:

said entry acceptance signal comprises a plurality of entry write areas for writing entry data for each of said slave machine, each of the entry write areas having a write address of said entry data;

each of said game terminals includes:

an overall data transfer control means for sending a data transfer signal comprising a plurality of data write areas to slave machines and providing overall control over data transfer in the game system when said game terminal has been set to be the master machine;

entry means for writing entry data for said game terminal into an empty entry write area of said entry acceptance signal to modify the entry acceptance signal and sending the modified entry acceptance signal to other game terminals, when said game terminal has been set to be a slave machine;

address setting means for setting a write address for data concerning said game terminal in a data write area of said data transfer signal based on said write address of said entry data in said entry acceptance signal; and data transfer means for receiving said data transfer signal, reading data for other game terminals, writing data concerning said game terminal into said data transfer signal based on the set write address, and sending said data transfer signal to the other game terminals.

21. The game system as defined in claim 12 wherein:

said entry acceptance signal comprises a plurality of entry write areas for writing entry data for each of said slave machine, each of the entry write areas having a write address of said entry data;

each of said game terminals includes:

an overall data transfer control means for sending a data transfer signal comprising a plurality of data write areas to slave machines and providing overall control over data transfer in the game system when said game terminal has been set to be the master machine;

entry means for writing entry data for said game terminal into an empty entry write area of said entry acceptance signal to modify the entry acceptance signal and sending the modified entry acceptance signal to other game terminals, when said game terminal has been set to be a slave machine; address setting means for setting a write address for data concerning said game terminal in a data write area of said data transfer signal based on said write address of said entry data in said entry acceptance signal; and data transfer means for receiving said data transfer signal, reading data for other game terminals, writing data concerning said game terminal into said data transfer signal based on the set write address, and sending said data transfer signal to the other game terminals.

22. The game system as defined in claim 13 wherein:

said entry acceptance signal comprises a plurality of entry write areas for writing entry data for each of said slave machine, each of the entry write areas having a write address of said entry data;

each of said game terminals includes:

an overall data transfer control means for sending a data transfer signal comprising a plurality of data write areas to slave machines and providing overall control over data transfer in the game system when said game terminal has been set to be the master machine;

entry means for writing entry data for said game terminal into an empty entry write area of said entry acceptance signal to modify the entry acceptance signal and sending the modified entry acceptance signal to other game terminals, when said game terminal has been set to be a slave machine;

address setting means for setting a write address for data concerning said game terminal in a data write area of said data transfer signal based on said write address of said entry data in said entry acceptance signal; and data transfer means for receiving said data transfer signal, reading data for other game terminals, writing data concerning said game terminal into said data transfer signal based on the set write address, and sending said data transfer signal to the other game terminals.

23. The game system as defined in claim 1 wherein:

said game terminals are connected in a loop structure by data transfer lines, and data transfer occurs in one direction around said loop.

24. The game system as defined in claim 2 wherein:

said game terminals are connected in a loop structure by data transfer lines, and data transfer occurs in one direction around said loop.

25. A method of entering a game system, wherein said game system comprises a plurality of independent game terminals connected by data transfer lines for mutually transmitting and receiving data, and said game system provides a multiplayer game wherein a player at one of said game terminals plays within a common game space against players at other game terminals while watching a game image on a screen, comprising the steps of:

setting a master/slave relationship based on whether data is passing through said data transfer lines when each of said game terminals starts up, wherein said game terminal is a master machine when data is not passing through said data transfer lines and a slave machine when data is passing through said data transfer lines;

repeatedly sending an entry acceptance signal, even after said game system is operating, from said master machine to said slave machine for accepting an entry of said slave machine into said game system;

starting data transfer after said slave machine has received said entry acceptance signal; and accepting the entry into said game system of another game terminal without obstructing said multiplayer game even after said game system is operating.

\* \* \* \* \*